United States Patent [19]

Freeman et al.

[11] Patent Number: 4,688,134

[45] Date of Patent: Aug. 18, 1987

[54] GROUND FAULT CIRCUIT INTERRUPTER AND ELECTRONIC DETECTION CIRCUIT

[75] Inventors: LeRoy M. Freeman, Westbury; Paul D. Gernhardt, Northport; Ferdinand E. Orbeta, Kew Gardens, all of N.Y.

[73] Assignee: Slater Electric Inc., Glen Cove, N.Y.

[21] Appl. No.: 690,160

[22] Filed: Jan. 10, 1985

[51] Int. Cl.$^4$ .............................................. H02H 3/26
[52] U.S. Cl. ...................... 361/45; 361/394; 361/395; 361/115; 335/18
[58] Field of Search ..................... 361/45, 46, 54, 115, 361/392, 394, 395, 399, 405; 323/242, 326; 307/252 J, 252 UA, 252 W, 252 N; 335/18, 190

[56] References Cited

U.S. PATENT DOCUMENTS 3,973,171  8/1976  Howell ................................... 361/87
4,521,824  6/1985  Morris et al. .......................... 335/18

Primary Examiner—A. D. Pellinen
Assistant Examiner—Jeffrey A. Gaffin
Attorney, Agent, or Firm—Morgan & Finnegan

[57] ABSTRACT

In a ground fault circuit interrupter (GFCI), a pair of flexure arms having moveable contacts disposed thereon are deflected in response to the activation of a solenoid having a moveable core. The core of the solenoid causes a pair of cam actuators which are preferably coupled together by a catcher to rotate. The rotation of the cam actuators causes the deflection of the flexure arms, thereby separating the moveable contacts from the stationary contacts and interrupting the flow of current. The activation of the solenoid is controlled by an electronic module. The electronic module includes a detection circuit which inhibits the solenoid from opening the contacts until there is sufficient electrical energy to insure that the kinetic energy of the solenoid will cause the contacts to latch open. The electromechanical current interrupter and the electronic module are disposed within a housing that can be mounted within a standard electrical receptacle box.

25 Claims, 23 Drawing Figures

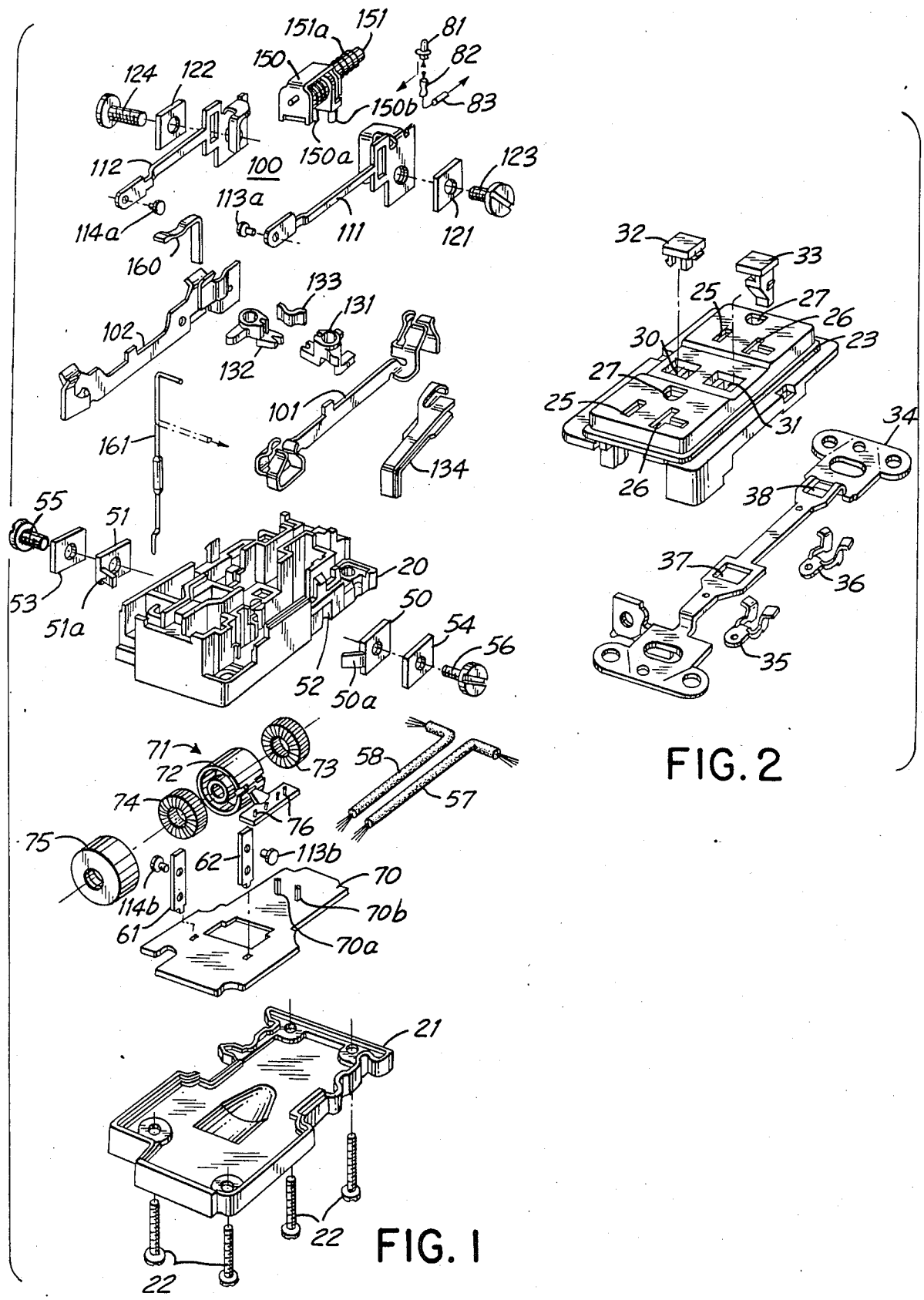

4,688,134

GROUND FAULT CIRCUIT INTERRUPTER AND ELECTRONIC DETECTION CIRCUIT

BACKGROUND OF THE INVENTION

1. Field of the Invention

The apparatus of the present invention relates to electrical power distribution systems, and more specifically to a ground fault circuit interrupter.

2. Description of the Prior Art

Ground fault circuit interrupters (GFCI) are devices which may be mounted in standard electrical receptacle boxes and which are useful for quickly interrupting the flow of current when a fault occurs. The ground fault circuit interrupter is typically comprised of an electronic circuit for detecting the electrical fault and an electromechanical current interrupter. When the cause of the fault has been corrected, the ground fault circuit interrupter can be reset by depressing a reset button disposed on the face of the ground fault interrupter. A representative example of such a device is described in U.S. Pat. No. 3,813,579 by Doyle et al., issued on May 28, 1974.

There are several other patents which disclose ground fault circuit interrupters. The electromechanical current interrupter of these devices, however, can be characterized as an electromechanical device utilizing either a moving core and helical coil as the power element or as an electromechanical device utilizing a fixed core, helical coil and an armature as the power element. A typical example of a ground fault circuit interrupter device having a moving core which opens spring actuated contacts is disclosed in U.S. Pat. No. 4,247,840, Cooper et al., issued Jan. 21, 1981 and assigned to GTE. A typical example of a ground fault interrupter device having a fixed core which opens spring actuated contacts is disclosed in U.S. Pat. No. 4,086,549, issued Apr. 25, 1978 to assignee of the present invention.

Since the electromechanical current interrupter device of a ground fault interrupter may be disposed inside a standard electrical receptacle box, space is at a premium and it is difficult to design a reliable device having good mechanical leverage to open a pair of contacts. An approach to a similar problem is disclosed in U.S. Pat. No. 4,386,338 by Doyle et al. issued May 31, 1983 and assigned to Leviton Manufacturing Co. The apparatus of the '338 patent is similar to an impulse latching relay such as the Potter & Brimfield type PC (manufactured approximately 1955-1975) but utilizes a pulling solenoid actuation instead of a relay. The solenoid mechanism is complex and the arm opening mechanism has high friction and has a poor mechanical advantage so that a bulky coil is required to actuate the mechanism.

Accordingly, there is a need for a reliable electromechanical current interrupter device for a ground fault circuit interrupter which can directly utilize the kinetic energy of the moving core of a solenoid. The present invention, therefore, is unique among ground fault current interrupters, since it applies the operating force of the solenoid to open the contacts and does not relay upon manually set springs to perform this function.

SUMMARY OF THE INVENTION

The apparatus of the present invention provides a reliable electromechanical current interrupter device for a ground fault circuit interrupter which applies the operating force of a solenoid to open the contacts and which can be packaged for mounting in a standard electrical receptacle box. The device includes an electromagnetic coil or solenoid having a moveable core, and two pivot arms or cam actuators which are coupled together by gears and a catcher and which rotate when the moveable core displaces the catcher. As the cam actuators rotate, they cause a pair of flexure arms having moveable contacts disposed thereon to deflect. The deflection of the flexure arms causes an opening between stationary contacts and the moveable contacts on each of the flexure arms. The electromagnetic coil is energized and the contacts are opened when an electronic circuit detects a fault in the conducting wires connected to the ground fault circuit interrupter.

The electronic detection circuit includes a transformer for detecting a fault in the power lines connected to the ground fault circuit interrupter. This fault which causes an imbalance in the power lines produces a signal which is amplified and applied to a threshold circuit and silicon controlled rectifier drive. The SCR controls the current through a bridge rectifier connected to the solenoid, such that when the SCR fires the solenoid is activated and a pair of contacts open to interrupt the current in the power lines. The operation of the SCR, however, is inhibited near the end of a cycle associated with the output of the bridge rectifier, such that the solenoid is not actuated if there is insufficient electrical energy in that cycle to cause the contacts to latch open. Upon the occurrence of the next cycle, the SCR will fire and the actuated solenoid will cause the contacts to latch in the open position. This arrangement prevents the solenoid from only partially opening the contacts.

BRIEF DESCRIPTION OF THE DRAWINGS

FIGS. 1 and 2 are exploded perspective views of the apparatus of the present invention;

DETAILED DESCRIPTION OF THE INVENTION

Figure 3:
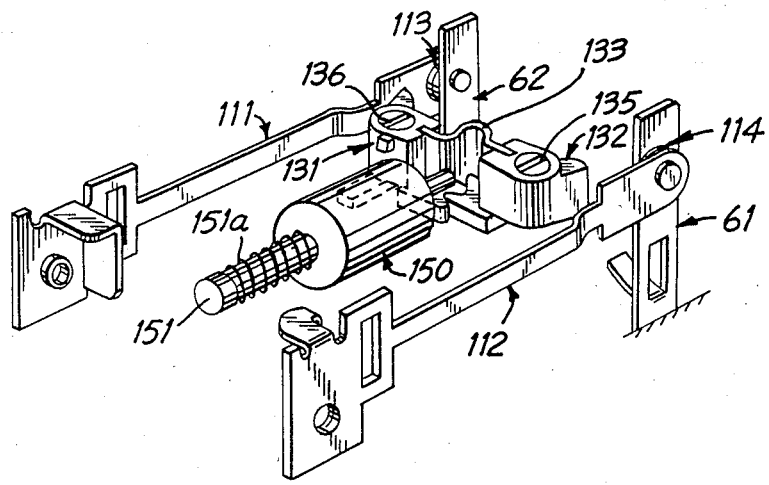
FIG. 3 is a schematic illustration of the electromechanical current interrupter device used to open a pair of contacts.

Referring now to FIGS. 1 and 2, exploded perspective views of the apparatus of the present invention are provided. The present invention includes a ground fault circuit interrupter (GFCI) which is disposed in a housing 20. The housing 20 encloses a current interrupter 100. The bottom of the housing 20 is sealed by a back cover 21 that encloses a printed circuit board 70 and its associated electronics. The back cover 21 is fastened to the face cover 23 through the housing 20 by a plurality of screws 22. The top of the housing 20 is sealed by a face cover 23 of FIG. 2.

The face cover 23 has two sets of apertures 25, 26, 27 for a standard three blade plug as well as apertures 30, 31 for a test button 32 and a reset button 33. A mounting strap 34 is disposed between the face cover 23 and the housing 20. A pair of ground terminals 35, 36 are disposed in apertures 37, 38 and cooperate with the ground blade of a three blade plug which may be seated in either of the apertures 27.

The printed circuit board 70 has a transformer 71 mounted thereon. The transformer 71 is comprised of a housing 72, a neutral transformer 73, a differential transformer 74, and a transformer cup 75. The electrical connections between the printed circuit 70 and the transformer 71 are provided by pin terminals 76.

The housing 20 also includes a neutral supply terminal 50 and a line supply terminal 51 which are seated in grooves 52 found on opposite sides of the housing 20. Optional pressure pads 53, 54 which secure external conducting wires (not shown) to the terminals 50, 51 are fastened to the terminals by screws 55, 56. A pair of shunt wires 57, 58 are welded to tails 50a, 51a on terminals 50, 51 respectively and are connected to stationary terminals 61, 62. The shunt wires 57, 58 pass through the transformer assembly 71. The stationary terminals 61, 62, which include stationary contacts 114b, 113b, are attached to the printed circuit board 70.

The housing 20 provides support for a neutral receptacle terminal 101 and a line receptacle terminal 102 which are disposed in operative relationship to neutral moveable terminal 111 and a line moveable terminal 112, respectively. The neutral moveable terminal 111 and the line moveable terminal 112 each include a respective contact 113a, 114a. Pressure pads 121, 122 are optionally affixed to the neutral moveable terminal 111 and line moveable terminal 112 by screws 123, 124. The neutral moveable terminal 111 and the line moveable terminal 112 are deflected by a neutral cam actuator 131 and a line cam actuator 132. A moveable core catcher 133 bridges between the cam actuators 131, 132 and is responsive to the displacement of the moveable core 151 of a solenoid 150. To permit a very shallow depth for the housing 20, the actuating solenoid 150 is placed in a position acting parallel to and immediately behind the face cover 23. The solenoid 150 includes sockets 150a, 150b, which are connected to pins 70a, 70b on printed circuit board 70.

A test spring 160 that is responsive to the depression of the test button 32 is disposed within the housing 20. The test spring and the test resistor 161 provide an electrical path between the line load side receptacle terminal 102 and the neutral supply terminal 50 in order to simulate a relatively low level ground fault of approximately 8 ma. The present invention also may include a LED light 81, a resistor 82, and a diode 83 (or equivalent) for providing a visual indication that the contacts 113, 114 are closed.

The housing 20 also includes a spring or latching mechanism 134 hereinafter described in greater detail in conjunction with FIG. 4.

Referring now to FIG. 3, a schematic illustration of the electromechanical current interrupter 100 is provided. The current interrupter 100 includes current carrying flexure arms 11, 112 having electrical contacts 113, 114 on one end and the other end of each flexure arm is rigidly mounted in the plastic wiring device housing 20. The solenoid coil 150 is rigidly affixed to the housing 20 and has a moveable core 151 within it. The solenoid 150 also includes a return spring 151a. When energized the core 151 moves against the metal catcher piece 133, moving it away from the coil of solenoid 150. As the catcher 133 moves it carries with it the plastic pivoting arms or cam actuators 131, 132 The cam actuators 131, 132 pivot about the bosses 135, 136 which are rigid parts of the housing 20. The cam actuator 132 pivots in a clockwise direction and cam actuator 131 pivots in a counter clockwise direction. As the cam actuators 131, 132 rotate they contact flexure arms 111, 112 and cause them to move away from the stationary terminals 61, 62, thus opening contacts 113, 114. This is the means by which the line and neutral supply entering through stationary terminals 61, 62 is separated from the load lines attached to the flexure arms 111, 112.

Figure 4:
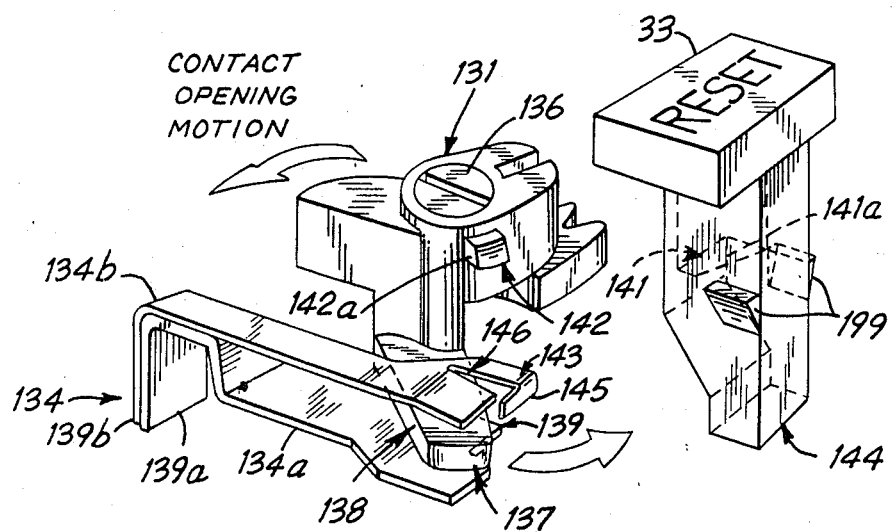
FIG. 4 is an illustration of the reset and latching mechanism of the present invention.

Referring now to FIG. 4, an illustration of the latching mechanism 134 is provided. The latching mechanism 134 may be a single piece double latching metal spring or a two piece spring which operates in conjunction with the pivoting cam actuator 131 and reset button 33 to hold the contacts 113, 114 open after a fault actuates it and until the reset button 33 is manually pushed. Preferably, the latching mechanism is comprised of spring members 134a and 134b. The joining tails 139a, 139b of the spring members 134a, 134b are inserted into a receiving hole in the middle housing 20. This two member arrangement simplifies the assembly of the device.

When the pivoting cam actuator 131 is rotated, an extension 137 moves as a part of it to a position where the trailing edge 138 of extension 137 passes beyond the edge 139 of spring member 134a allowing the edge 139 to move upward behind edge 138, thereby holding cam actuator 131 in the "contact open" position. The reset button 33 rests its surface 141 against surface 142 of cam 131 when the contacts 113 are closed and reset button 33 is flush with the face cover 23. However, when the cam 131 rotates to open the contacts 113 the surface 142 moves off of surface 141 and allows reset button 33 to move upward and behind the trailing edge of surface 142 in response to the upward push of portion 143 of the spring member 134b against the surface 144 of reset button 33. Thus, the edge 139 holds the extension 137 in the contact open position, but the corner 141a also is capable of holding edge 142a if edge 139 and extension 137 should fail. Detents 199 limit the upward motion of 33 in face 23.

To reset the contacts 113, 114 the reset button 33 is manually pushed down such that surface 144 pushes the surface 143 of the spring member 134b and moves it downward (corner 141a also clears edge 142a). It should be noted that surface 143 of the latching mechanism 134 is always in contact with the surface 144 of the reset button 33. This causes push bar 145 to push the end of the spring member 134a down and release the edge 138 of cam actuator 131 from edge 139 so that the edge 138 rotates back over the spring member 134a until it strikes the edge 146 of the spring member 134b, thereby continuing to hold the contacts 113, 114 open. Then as the reset button 33 is manually released the surface 143 pushes it up releasing edge 138 of cam 131 at edge 146 and allowing cam actuator 131 to move clockwise under the spring pressure of the contact arm 111. The pivoting cam actuator 132 is geared to cam actuator 131 and also closes.

Figure 5:
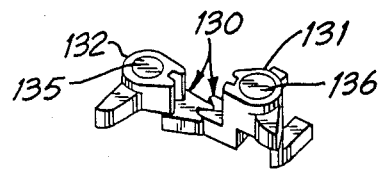
FIG. 5 is an illustration of the cam actuators of the present invention.

This geared relationship is illustrated in FIG. 5. The mating gears 130 (not shown in FIGS. 3 and 4 for purposes of simplicity) are integral parts of cam actuators 131, 132 and coordinate their rotation about the bosses 135, 136. Thus cam actuators 131, 132 exhibit "mirror image" motion to simultaneously open contacts 113, 114. It should be noted that contact forces are isolated from reset forces, and therefore a relatively light and pleasing feel of the reset button 33 results.

Figure 6A:
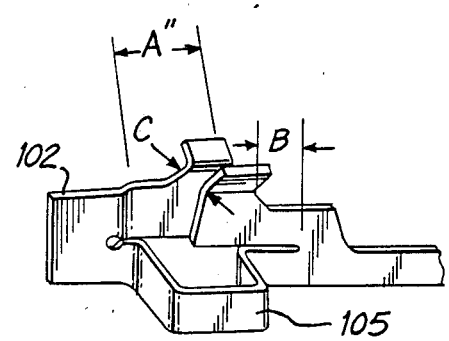
FIGS. 6A and 6B are illustrations of spring arms used to engage a receptacle blade.
Figure 6B:
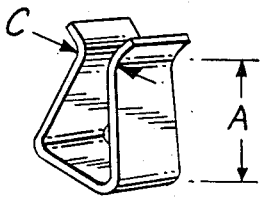

A problem with shallow depth receptacles lies in the short distance which is available for flexing the spring arm which engage the plug blade as in the prior art devices of FIG. 6B. In the apparatus of the present invention as illustrated in FIG. 6A this problem is overcome by placing the receptacle spring arms on terminal 102 at right angles to the direction of insertion of the plug blade. This offers the possibility of having a longer blade beam flexing element "A" and permits torsional flexure in region "B" in addition to simple beam flexure. Both of these characteristics permit a relatively uniform response to deflection, and a relatively low stress level within the material for a given developed contact force "C" between the plug blade and the receptacle elements. In addition, this configuration provides a receptacle design which has a continuous electrical path to each side of the blade receiving region of the receptacle, and which localizes deflections during blade insertion to the immediate blade receiving region 105.

Figure 7:
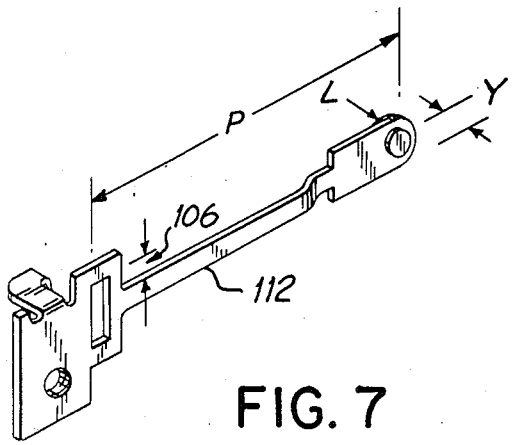
FIG. 7 is an illustration of a flexure arm of the present invention.
Figure 8:
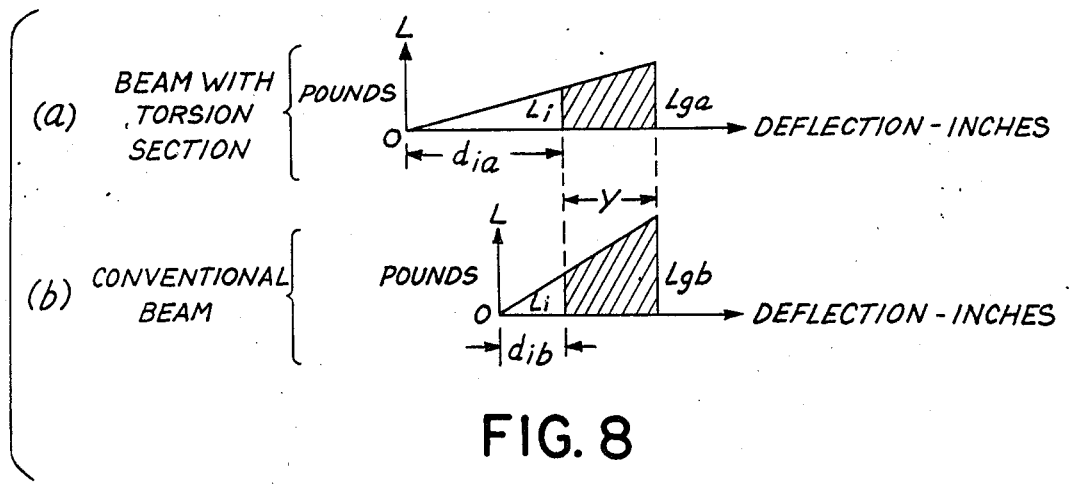
FIG. 8 is a graphical representation of deflection loads exerted upon two different types of beams.

Referring now to FIG. 7, an illustration of the flexure arm 112 is provided. The flexure arm 112 has two torsional sections 106 which in effect add length to the beam member 112. This causes a greater deflection for a given load, in effect softening the beam. FIGS. 8a, 8b are load deflection plots which further illustrate the operation of the flexure arm 112. FIG. 8a describes a plot for a torsion type arm as in FIG. 7, and FIG. 8b describes a plot for a conventional beam type arm.

On the two plots $L_i$ is an equal load value representing contact pressure (L in FIG. 7) with the contacts closed. It should be noted that the torsion arm has been deflected (y in FIG. 7) a greater distance $d_{ia}$ (in the FIG. 8a) than the conventional beam arm $d_{ib}$ (in FIG. 8b) to achieve the initial contact load $L_i$. The contact opening distance y is the same, but the final torsional contact opening load, $L_{ga}$, is less than the final beam opening load, $L_{gb}$, because of the smaller load-deflection slope of FIG. 8a. The area under the curve between $L_i$ and $L_{g(a\ or\ b)}$ corresponds to the work done in opening the contacts and it is less for the torsion system of FIG. 8a. As a result of this effect the work required to open the contacts is greatly reduced by the use of the torsion member 106.

Figure 9A:
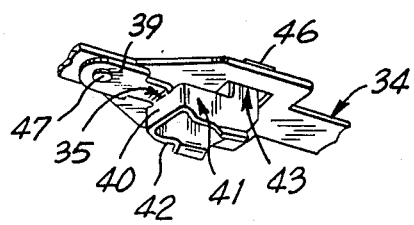
FIGS. 9A and 9B illustrate the ground contact for the apparatus of the present invention.
Figure 9B:
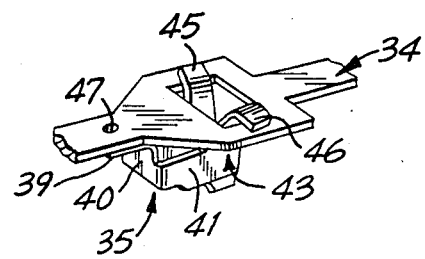

Referring now to FIGS. 9A and 9B top and bottom views of the bifurcated ground contact 35 for the present invention is provided. The mounting strap or yoke 34 is used to mount the entire device in a wall box. The ground contact 35 consists of a mounting tab 39, a cross structure 40, two torsional members 41 and 42, two blade contact members 43 and 44, and two support tabs 45 and 46. There is also a mounting point 47.

The unique features of this design include the torsional members 41, 42 which gives the blade contact members 43, 44 the ability to flex within the mounting strap opening but take no permanent set. Each member 41, 42 acts as a beam and as a torsional member in combined loading and thus gives increased motion without exceeding the yield strength of the material. The tabs 45, 46 are trapped between the plastic face cover 23 of the entire device and the yoke 34 and resist the thrusting and withdrawal force of an electrical grounding blade of a three blade plug.

Figure 10:
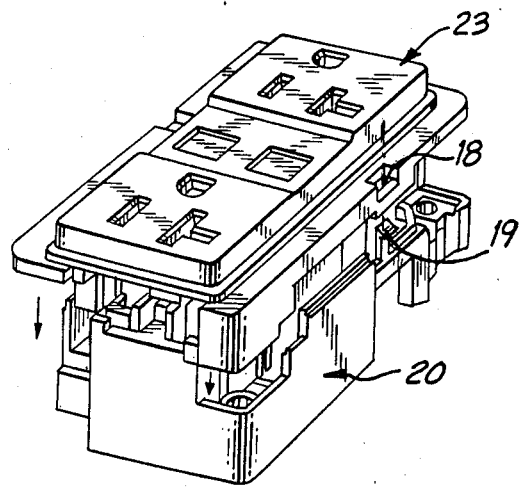
FIG. 10 illustrates snap fingers used to assemble the device of FIG. 1.

Referring now to FIG. 10 an illustration of a snap finger 19 used to secure the face cover 23 to the housing 20 is provided. There are two snap fingers 19, one on each side of housing 20, which cooperate with an aperture 18 in the face cover 23. The two snap fingers 19 hold the face cover 23 closed after all the mechanical parts are assembled into the upper half of the housing 20. This feature makes the assembly process easier and allows the partially assembled device to be turned upside down for assembling the electronic module associated with printed circuit board 70.

Figure 11A:
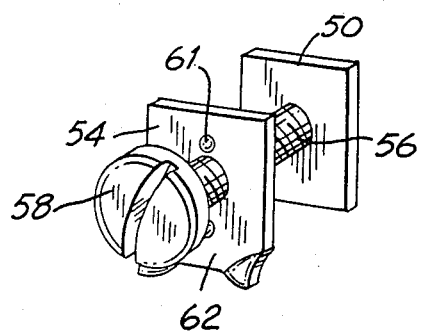
FIGS. 11A and 11B illustrate the device for securing conducting wires to the device of FIG. 1.
Figure 11B:
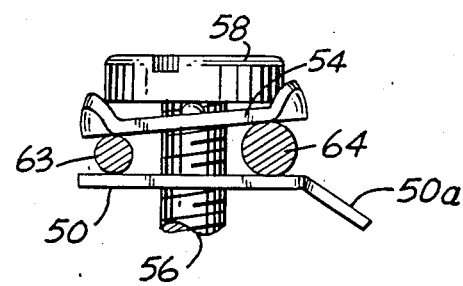

Referring now to FIGS. 11A and 11B, the device for securing the supply conducting wires to the apparatus of the present invention is illustrated in two views. An optional pressure pad 54 is designed to be positioned on the terminal screw 56 body between the screw head 58 and the terminal plate 50 The pressure pad 54 has dimples 61, 62 on the top and bottom of the thru hole for pivoting. Pivoting is needed so that two wires 63, 64 of slightly different diameters can be captured securely. This pressure pad 54 can be omitted and screw 56 and terminal plate 50 can act as a normal binding wire attachment system. This same system can be used on the load side wire connections of FIG. 1.

Figure 12A:
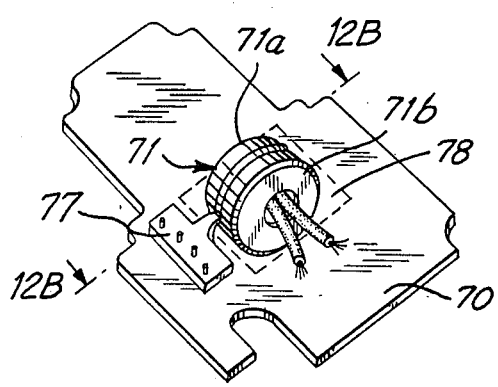
FIGS. 12A and 12B are illustrations of a transformer assembly mounted upon a printed circuit board.
Figure 12B:
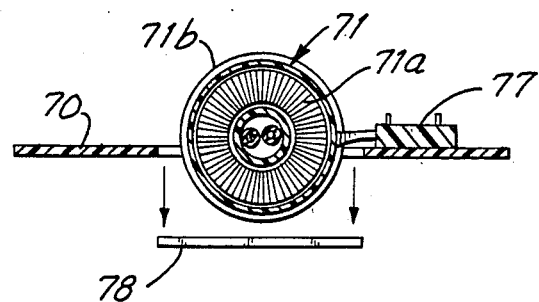

Referring now to FIGS. 12A and 12B illustrations of the transformer assembly 71 are provided. The transformer assembly 71 is comprised of transformers 71a, 71b which are heat sensitive components, and excessive heat from a wave soldering operation can damage them. In prior art GFCI's, traditionally, the transformer assembly 71 is manually soldered into the printed circuit board after wave soldering the other components. To expedite the assembly of the electronic module on the printed circuit board 70, it is preferred that the transformer assembly 71 be wave soldered into the printed circuit board 70 along with the rest of the components. The transformer assembly 71 includes an arm 77 which permits the assembly to be safely positioned as shown in FIG. 12A during the wave soldering. The perforated popaway window 78 in the printed circuit board 70 under the transformer assembly 71 provides protection during the wave soldering. After the transformer assembly 71 has been soldered, the window 78 is poppedaway and the transformer assembly 71 pushed down to its correct position as illustrated in FIG. 12B.

Figure 13:
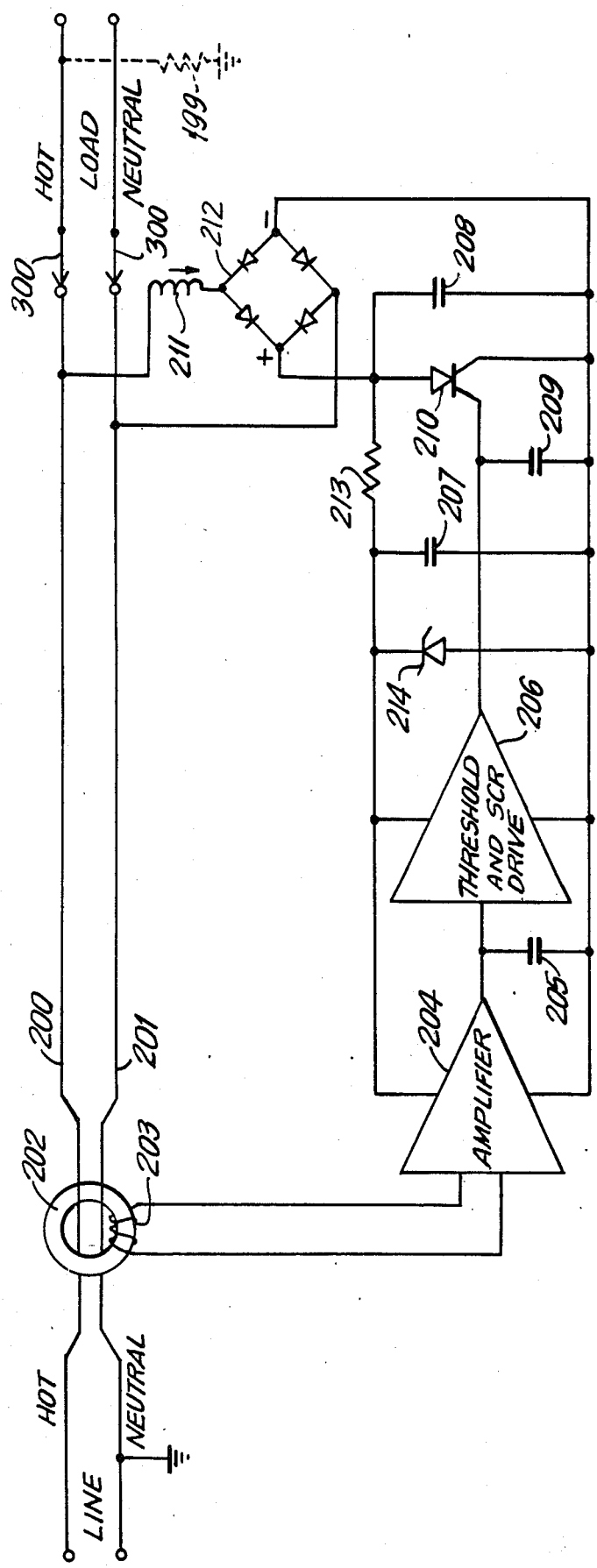
FIG. 13 is a simplified schematic diagram of a conventional detection circuit for a ground fault circuit interrupter.

Referring now to FIG. 13, the simplified ground fault circuit interrupter (GFCI) circuit diagram indicates some of the potential features of a common type configuration that is used in prior art devices for detecting a fault. A representative example of such a ground fault circuit interrupter detection circuit is described in U.S. Pat. No. 3,936,699 entitled "Ground Fault Protective Circuitry", issued Feb. 3, 1976, and assigned to Pass & Seymour, Inc.

The power line leads 200, 201 feed through the center core 202 of a transformer. When there is no fault condition, the currents in power lines 200, 201 are equal and opposite, generating a net zero field and therefore a theoretical net zero voltage across the secondary winding 203 of the transformer. When a fault occurs some of the current from the power line 200 is diverted to ground such that the currents in power lines 200, 201 are unequal. This grounding of power line 200 is represented in phantom by the resistor symbol 199. The difference in these currents is picked up by the secondary winding 203 of the transformer, amplified by the amplifier 204, and causes an integrating capacitor 205 to charge. If the fault current is sufficient, the capacitor 205 will charge to a level greater than the threshold level of a threshold and SCR drive circuit 206 and turn on SCR 210. The threshold and SCR drive circuit 206 as well as amplifier 204 may be an integrated circuit of the type manufactured and sold by National Semiconductor under the device number LM-1851. The SCR 210 operates the relay or solenoid coil 211 through the bridge rectifier 212 to open the load contacts 300, thereby removing power from the load and the fault. When the fault current is lo no longer present capacitor 205 discharges and the SCR 210 no longer fires. The bridge rectifier 212 supplies positive power to the SCR 210 for both polarities of line voltage so that the SCR 210 can fire for either polarity. The capacitor 208 helps inhibit line transients and surges from adversely affecting the other electronic components. Resistor 213 drops the line voltage from line levels to IC levels. The IC power supply voltage is filtered by capacitor 207 and regulated by zener diode 214 which may be part of the integrated circuit. The capacitor 209 is utilized to suppress high frequency noise spikes which otherwise might cause false tripping.

As has been noted, the moveable core of solenoid 211 utilizes kinetic energy to open the main contacts 300. This arrangement can introduce an operating problem. If a low level fault current occurs the electronic circuit integrator or capacitor 205 charges relatively slowly, resulting in the firing of the SCR 210 and activation of the moving core of the solenoid 211 near the end of a sinusoidal cycle of the power line. Once fired, the SCR 210 stays on until the zero crossing of the line cycle current. If the firing occurs too near the end of a cycle, there is insufficient time and energy to open the switch contacts 300 far enough to reach their mechanical latching condition. Once the contacts 300 do start to open, however, the fault condition is removed and the integrating capacitor 205 discharges to a point below the SCR 210 firing condition. When mechanically unlatched contacts 300 close again the fault is applied again and the integrating capacitor 205 starts to charge again. Under the right circumstances, this condition can cause the device to fire multiple times before the contacts 300 finally latch open. While this sequence is not necessarily dangerous, since the contacts are open much of the time, it can be quite annoying.

In another situation, if a fault occurs very near the end of a power line cycle the moving core of solenoid 211 can move to and touch the opening mechanism (not shown) without mechanically opening the contacts 300, thereby not removing the fault. Without the apparatus of the present invention, the conventional electronics of FIG. 13 would hold the gate of the SCR 210 at a firing potential for a short time period so that immediately on the next half cycle the SCR 210 would refire. The moving core of solenoid 211 having been in contact with the opening mechanism, and not having sufficient time before the refiring of the SCR 210 to move back to its initial position, would not have sufficient kinetic energy to latch the contacts 300 open. However, the moving core of solenoid 211 can still temporarily open the contacts 300, without latching them open, thereby removing the fault and allowing the integrating capacitor 205 to discharge to below the SCR 210 firing level. The core of solenoid 211 can then return to its initial position and work properly on the next cycle. This condition can slightly slow down the time from fault initiation to the final latching open of the contacts 300. The time the contacts 300 are actually closed during this total sequence would still be short enough to maintain the required specifications for safety.

To overcome these problems, however, the SCR 210 can be inhibited from firing near the end of a power cycle. The inhibiting can be accomplished by turning on a switching device near the end of a cycle which effectively shorts the SCR 210 gate-to-cathode terminals. A fault occurring after the short is applied cannot turn on the SCR 210 for the remainder of the sinusoidal power line cycle (or fullwave rectified bridge output cycle).

There are numerous techniques to perform this task of inhibiting a thyristor from firing for a portion of a line cycle, such as utilizing the power line voltage amplitude, or zero crossing or peak voltage point as a reference. These techniques will now be explained in conjunction with the waveforms provided in FIG. 14. The first technique may employ the voltage amplitude information, such that the firing semiconductor or SCR 210 can be inhibited whenever the line voltage was below a certain level. i.e., the firing start could only occur around the peak amplitude. That is, firing could start any place in area V, when the instantaneous voltage of the line is greater than a selected threshold, and continue through area W. Firing could not start, in either area U or W, when the line voltage is below the threshold. Of course, the device would not fire without a fault, regardless of line voltage amplitude.

If a fixed threshold is compared to a varying line RMS voltage the inhibit point will move. For a nominal line voltage illustrated in FIG. 14, the input threshold limits occur at points 250 and 251. For a high line voltage the points would move to 252 and 253. If the firing occurs at point 253, the SCR 210 pulse energy content would actually decrease, from that obtained at nominal line voltage, since the firing duration decreases and the instantaneous amplitude at firing point 253 is still the same as at point 251 for the nominal line, i.e. equal to the fixed threshold voltage. Typical examples of circuits which would provide a fixed threshold for inhibiting the SCR 210 are provided in FIGS. 16 and 17.

Figure 14:
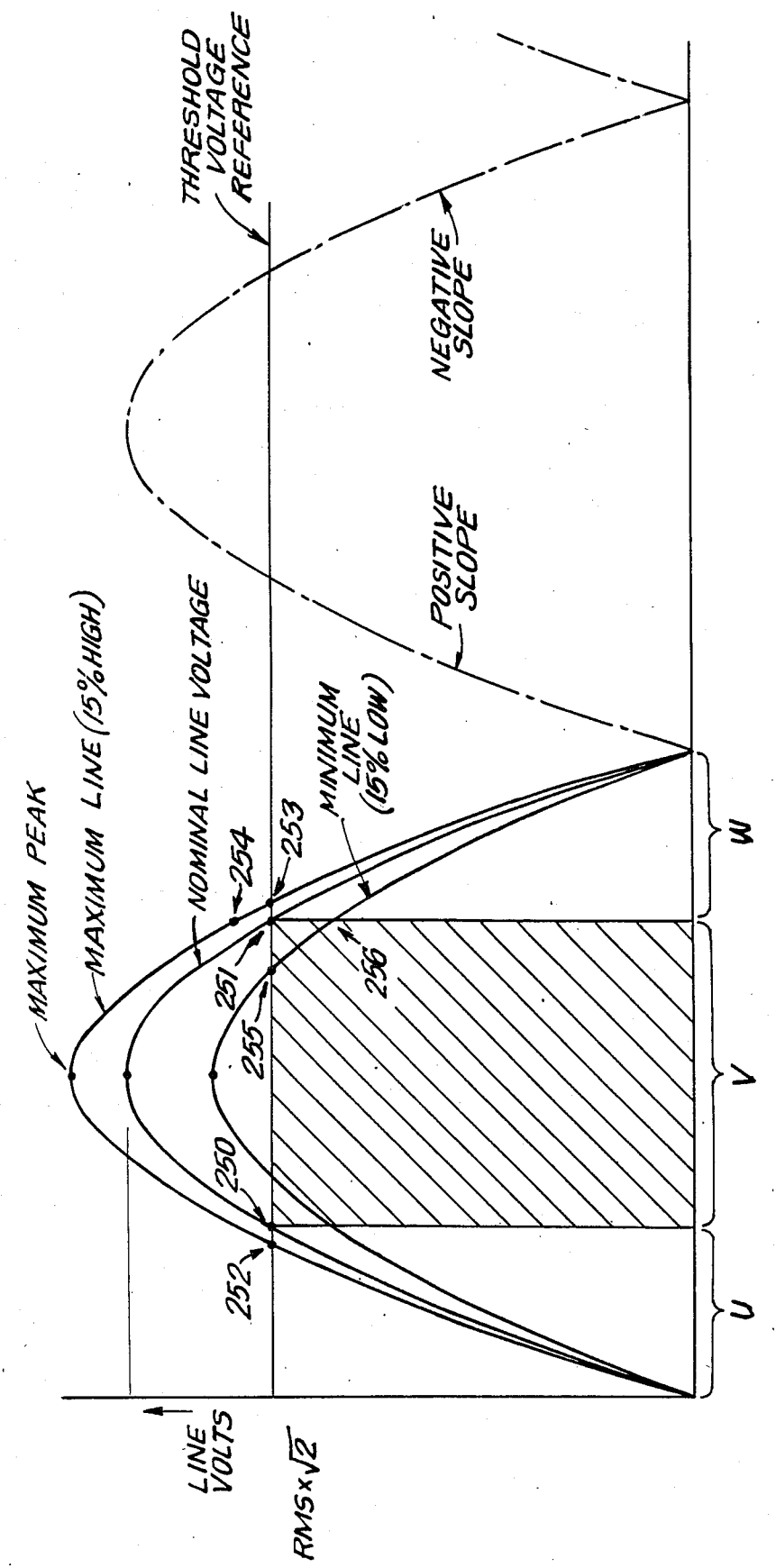
FIG. 14 is a waveform diagram of voltages associated with the apparatus of the present invention.
Figure 16:
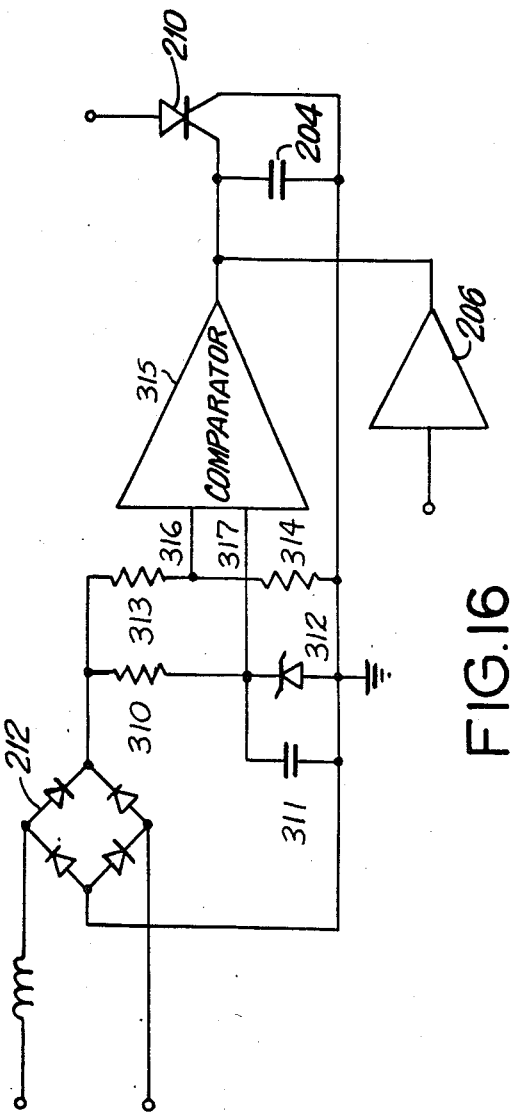
FIGS. 16, 17, and 18 are schematic diagrams of various circuits for implementing the practice of the present invention.

Referring now to FIG. 16, the full wave rectified output of bridge 212 (as shown in FIG. 14) is passed through resistor 310 to capacitor 311 and zener diode 312. The capacitor 311 filters the waveform to remove the valleys of the waveform between the negative slope and the positive slope (see FIG. 14). The zener diode 312 clips the remaining waveform providing a regulated DC reference voltage at the input 317 to a comparator 315. The other input 316 to comparator 315 is from bridge 212 output via resistor divider 313 and 314. With a fixed zener voltage, resistors 313 or 314 can be changed to adjust the level of the output voltage to the level of the bridge 212 at which input 316 is equal to input 317 and the comparator 315 switches to a high level. This might be set to occur, for example, at point 250 of FIG. 14 and keep the comparator output high from point 250 to point 251 and low for intervals U and W. The low outputs of most comparators, such as the LM 311, flow through the collector and into the grounded emitter of a sauturated NPN transistor. The grounding output transistor of the comparator 315, when it is on, therefore sinks any positive output from the SCR drive circuit 206. By the same token, the output of an SCR drive circuit such as that of the LM 1851 provides a positive current when it is on and a saturated to ground NPN transistor when it is low. This transistor in a similar fashion, when it is saturated, absorbs any positive output of the comparator 315. The SCR drive circuit 206 and the comparator 315 therefore function as a type of "AND" circuit. Before the SCR 210 can be triggered, both a ground fault must occur which attempts to put the output of 206 to a positive level, and the comparator must be in a high level output state, such as during time interval V of FIG. 14. If for some reason the SCR 210 were required to be exhibited during the V period instead of the U and W period, the leads 316 and 317 to the comparator 315 need only be reversed. Since the voltage across the zener at 317 is fixed, but the amplitude at 316 is proportionl to line voltage, the relative comparator switching point and therefore the SCR inhibit point will vary with line voltage as previously described.

Figure 17:
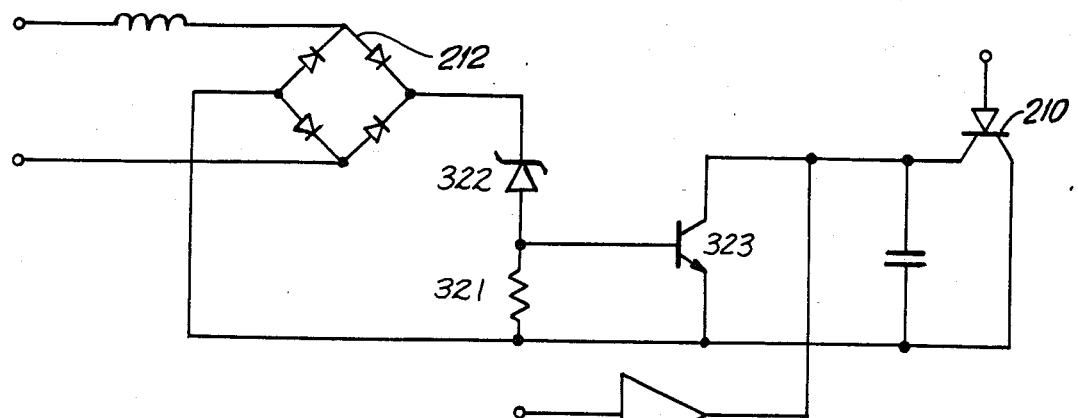

FIG. 17 is a simpler version of FIG. 16 and can be used to inhibit the SCR 210 from a triggering during the V period of FIG. 14. The NPN transistor 323 functions in the manner of a comparator, comparing the base voltage to the emitter voltage. The transistor turns on to absorb any potential output of 206 and thereby inhibit SCR 210 when the amplitude of the bridge output 212 is more than the breakdown voltage of the zener diode 322 plus the base to emitter voltage of the NPN transistor 323. In this case, the SCR driver does not have to absorb current from 323 since 323 has no positive power source of its own.

Another technique of the present invention utilizes a threshold proportional to the line voltage rather than a fixed threshold. At maximum ine voltage the variable threshold moves up so that point 254 of FIG. 14 is the new inhibit point. This occurs at a higher line voltage, say at point 254 and earlier in the cycle than point 253. The energy remaining in the cycle is greater at point 254 than a point 253. The cirucit of FIG. 18 is one possible implementation of a circuit which provides a proportional threshold inhibit.

Figure 18:
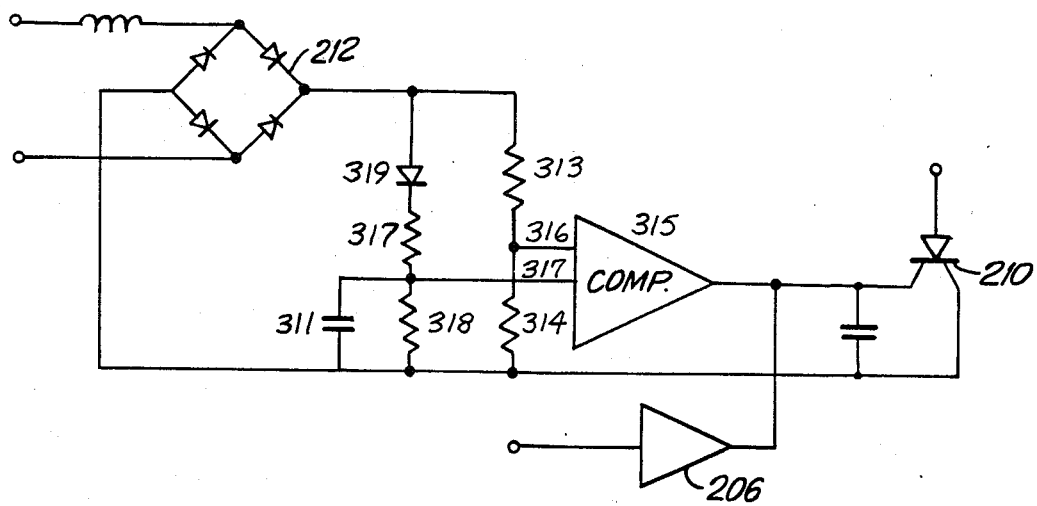

In FIG. 18, rectifier 319 and capacitor 311 filter the output to provide a DC voltage at 317 which is proportional to the resistive voltage divider 318 and 320 and to the amplitude of the line voltage or the bridge 212 output voltage.

In FIG. 14, therefore, as the line voltage increases the "Threshold Reference Voltage" at 317 also increases. Since both inputs of the comparator are changing in the same direction, the initiation and the end of the SCR inhibit voltage from the comparator would tend to stay at the same phase or the same interval after the line voltage zero crossings. This would tend to increase the worst case minimum time available for the SCR to fire before turning off at its zero current crossings. That is, for example, the inhibit would tend to stay at the time represented by 251 in FIG. 14, rather than shifting left or right in the cycle to points 255 or 253 of FIG. 14. The interaction of the SCR drive circuit 206 and the comparator circuit 315 with the SCR 210 have already been described in conjunction with the functions of FIG. 16.

Numerous other techniques, not described herein, exist for using a zero crossing point or peak amplitude point as a reference to generate a time signal which would allow the SCR 210 to fire through a fixed part of the cycle so as to provide a sufficient energy level. Such an energy level causes one firing of the moveable core of solenoid 211 to drive the opening mechanism to its latched open position.

Figure 19:
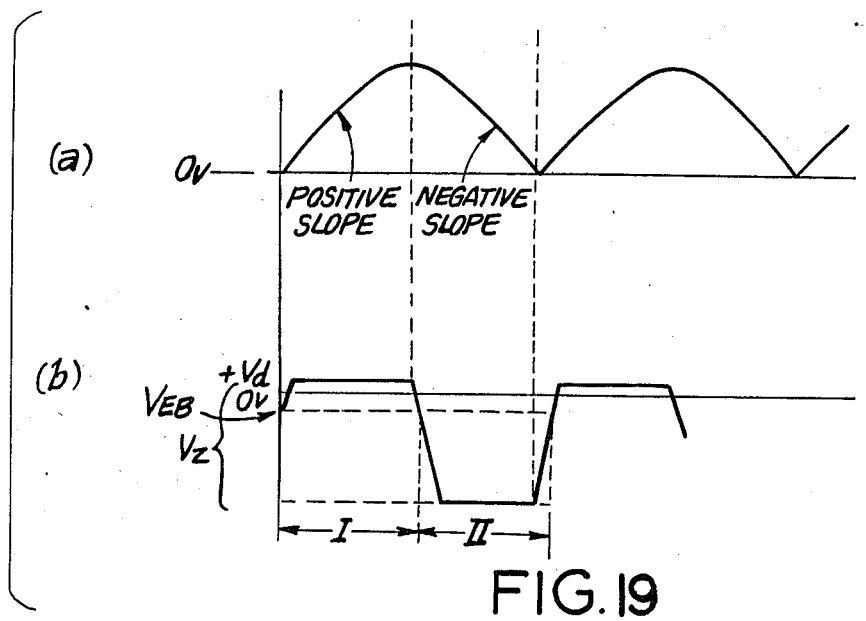
FIG. 19 is a diagram of waveforms associated with the preferred embodiment of the present invention.

The preferred embodiment of the present invention uses an ac-coupled differentiating network for providing a phase shift of about 90 degrees of the reference line voltage or bridge rectified line voltage. The phase shifted waveform has a positive voltage level during the upward slope of the bridge rectified sinusoidal line waveform, a negative voltage level during the downward slope, and about a zero voltage level at the peak of the reference line voltage or of the bridge-rectified line voltage. FIG. 19(a) provides an illustration of the bridge rectified line voltage and FIG. 19(b) provides an illustration of the phase shifted waveform.

Figure 15:
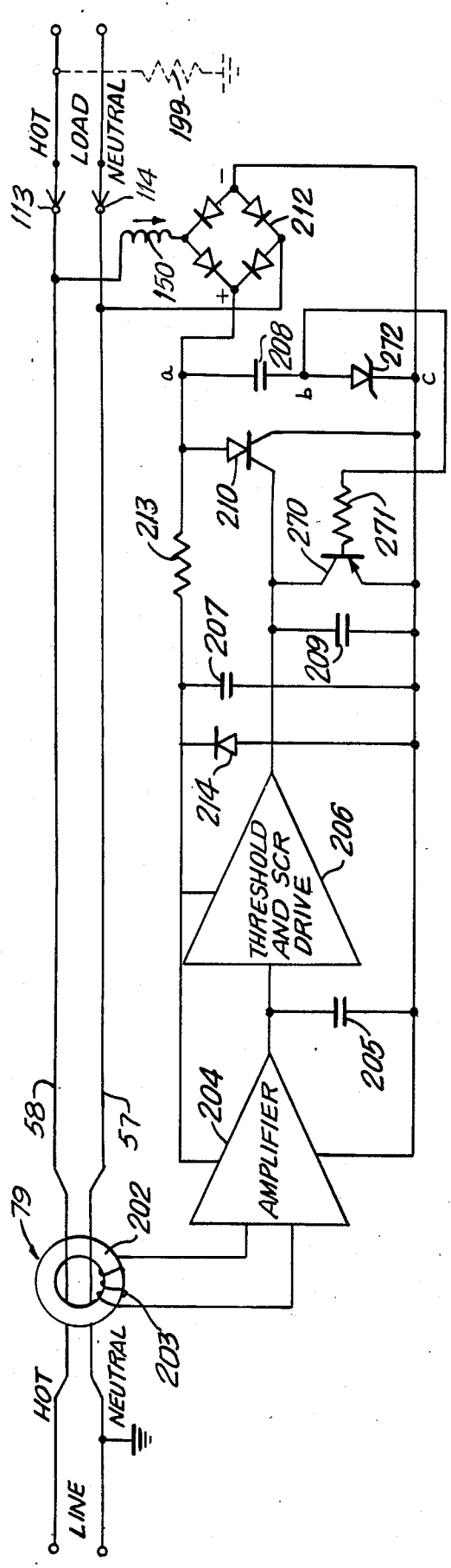
FIG. 15 is a schematic diagram of the apparatus of the present invention.

A modification to the conventional GFCI configuration to accomplish the phase shifted inhibition of SCR 210, is shown in FIG. 15. The modification includes the addition of a PNP transistor 270, resistor 271, zener diode 272 and capacitor 208. The capacitor 208 performs two functions. Its first function is to act as a high frequency filter for spikes and its second function is to act as part of a differentiator which is described in more detail below. The zener diode 272 clamps at a zener voltage level during the negative slope of the bridge output waveform and clamps at a low forward diode voltage drop during the positive slope of this waveform. It is, therefore, conducting at a low impedance for nearly the entire cycle of the bridge voltage of FIG. 19(a). Capacitor 208 in conjunction with the series connected low impedance of the zener diode 272 acts to inhibit transients and surges. If a transient should occur when the line voltage is close to zero and when the zener diode 272 normally would not be conducting, it will be coupled through capacitor 208, thereby raising the voltage level and reducing the impedance of zener diode 272 back to a low level. FIG. 19(a) shows the voltage output waveforms of the bridge 212 and FIG. 19(b) the waveforms at the anode of the zener diode 272.

Since the zener diode 272 has a low impedance in either polarity of conduction, it forms in conjunction with the capacitor 208 a very efficient differentiator, or waveform slope sensitive detector, which is relatively stable with line amplitude variations. As can be seen from FIGS. 19(a) and 19(b), when the power line voltage has a positive slope the voltage across the zener diode 272 goes positive and clamps at its positive diode forward conduction voltage $V_d$. When the supply voltage starts to decrease, i.e., it has a negative slope, the diode voltage starts to go negative until it clamps at its avalanche or zener voltage $V_z$. When the negative voltage is equal to the emitter-to-base threshold voltage of transistor 270 ($V_{EB}$ in FIG. 19(b)), the transistor starts to conduct. This effectively shorts the gate of the SCR 210 to its cathode, thereby preventing the SCR 210 from turning on as long as the transistor 270 is conducting. However, if the SCR 210 has already been firing, the shorting of its gate-to-cathode terminals could not turn off the SCR, since the SCR 210 is designed to extinguish its firing cycle only when its current conduction pases through zero. The resistor 271 limits the base current to the transistor 270 from being excessive.

Another way to look at the function of the circuit is that the waveform of FIG. 19(b) is twice the frequency of waveform of FIG. 19(a). Doubling the frequency enables the system to break the waveform of FIG. 19(a) into two separate time periods, i.e., a permit firing time I (FIG. 19(b)) and an inhibit-firing time II (FIG. 19(b)).

From the foregoing description, it can be appreciated that the apparatus of the present invention has numerous advantages over prior art GFCI's. These advantages include:

(a) A shallow depth of housing 20 improves room in flush outlet boxes for wiring. The forward mounting position of the solenoid coil 150 and component contact opening mechanism permit such a shallow depth.

(b) The use of screw terminals of FIG. 11 makes replacement of a standard receptacle (in retrofit situations) easier.

(c) The use of separate line contact arm 112 and neutral contact arm 113 permits individual control of contact pressures in production.

(d) The use of a mechanically efficient coordinated split actuating mechanism 131, 132, 133 permits variation of sequence of opening and distance of opening of the line and neutral contacts 113, 114.

(e) The elimination of a secondary or intermediate contact support mechanism simplifies mechanism and thereby improves operating reliability of the device. The solenoid 150 directly opens the contacts 113, 114 and reduces power required for opening.

(f) The elimination of a secondary contact support mechanism simplifies quality control requirements in production. Separation of contact and reset forces permits lighter push-button force on the reset button 33 and variation of one force without affecting the other.

(g) Other designs utilize a spring to provide power to open the contacts. The apparatus of the present invention utilizes the major source of power, the solenoid coil 150 to provide this function. Thus, if contacts 113, 114 become welded shut maximum power is available to open them.

(h) A hindrance in utilizing the solenoid core motion to open the power contacts lies in the fact that the solenoid supply system ceases to receive power when the solenoid core opens the main power contacts. This is overcome in the present invention by utilizing a period of free travel for the solenoid core 150 before it touches the contact opening mechanism 131, 132, 133 and thereby opens the power supply. The free travel builds up kinetic energy.

(i) A problem of some GFCI's is that the manual reset operation, after the unit has tripped and the contacts have opened, permits "teasing" of the load contacts. "Teasing" here means removing some of the normal contact pressure. This can be done at any time the GFCI power contacts are set. "Teasing" of the contacts causes arcing and can erode the contact surface. In the apparatus of the present invention the reset device of FIG. 4 cannot open the contacts 113, 114 and therefore cannot "tease" them.

While the invention has been described in its preferred embodiments it is to be understood that the words which have been used are words of description rather than limitation and that changes may be made within the purview of the appended claims without departing from the true scope and spirit of the invention in its broader aspects.

What is claimed is:

1. A ground fault circuit interrupter in a power distribution system comprising:

an electromagnetic coil means having a moveable core;

at least two pivot arms that rotate in response to the linear movement of the moveable core of said electromagnetic coil means;

at least two pairs of contacts, one contact of each pair being stationary and the other contact of each pair being disposed on a deflectable flexure arm, each of said deflectable flexure arms being responsive to the rotation of one of said pivot arms, said deflectable flexure arms normally biasing said contacts in a closed position;

means detecting the occurence of a fault in said power distribution system in order to actuate said electromagnetic coil means, such that said pivot arms rotate, thereby causing said deflectable flexure arms to separate said contacts and interrupt the flow of current, said detecting means having a bridge rectifier that provides a current to said electromagnetic coil means when a silicon controlled rectifier responds to an imbalance in the power lines; and means inhibiting the operation of the silicon controlled rectifier near the end of a cycle associated with the bridge rectifier, such that the electromagnetic coil means is not actuated if the electric power associated with the cycle is insufficient to cause the contacts to latch in an open position.

2. A ground fault circuit interrupter according to claim 1 wherein said pivot arms are coupled together by a catcher which cooperates with the moveable core of said electromagnetic coil means.

3. A ground fault circuit interrupter according to claim 1 which further includes load terminals electrically coupled to said flexure arms and including two receptacle spring arms disposed at right angle to the insertion of a plug blade.

4. A ground fault circuit interrupter according to claim 1 which further includes a mounting strap with an aperture therein and a bifurcated ground contact disposed in said aperture and comprised of a mounting tab, a cross structure, and means contacting the ground blade of a plug.

5. A ground fault circuit interrupter according to claim 4 wherein said means contacting the ground blade of a plug includes a pair of torsional members connected to said cross structure, a blade contact member connected to each of said torsional members and a support tab connected to each of said blade contact members.

6. A ground fault circuit interrupter according to claim 1 which further includes a housing and a face plate, said housing including at least one snap finger which cooperates with an aperture in said face plate.

7. A ground fault circuit interrupter according to claim 1 wherein said means for detecting the occurrence of a fault includes a plurality of transformers which are coupled to a printed circuit board having a popaway aperture.

8. A ground fault circuit interrupter in a power distribution system comprising:

an electromagnetic coil means having a moveable core;

at least two pairs of contacts, one contact of each pair stationary and the other contact of each pair being disposed on a deflectable member;

means applying the operating force of said electromagnetic coil means to directly open said contacts by moving said deflectable members, said deflectable flexure arms normally biasing said contacts in a closed position;

means detecting the occurrence of a ground fault in said power distribution system in order to actuate said electromagnetic coil means; and means inhibiting the electromagnetic coil means such that said electromagnetic coil means is not actuated unless there is sufficient energy to cause the contacts to latch in an open position.

9. A ground fault circuit interrupter according to claim 8 which further includes resetting means for preventing said contact from being teased when said contacts are open.

10. A ground fault circuit interrupt in a power distribution system comprising:

an electromagnetic coil means having a movable core;

at least two pivot arms that rotate in response to the linear movement of the moveable core of said electromagnetic coil means, said pivot arms being coupled together by a catcher that cooperates with the moveable core of said electromagnetic coil means;

at least two pairs of contacts, one contact of each pair being stationary and the other contact of each pair being disposed on a deflectable flexure arm, each of said deflectable flexure arms being responsive to the rotation of one of said pivot arms, said flexure arms including torsion elements that increase the effective length of said flexure arms;

means detecting the occurrence of a fault in said power distribution system in order to actuate said electromagnetic coil means, such that said pivot arms rotate, thereby causing said deflectable flexure arms to separate said contact and interrupt the flow of current, said detecting means having a bridge rectifier that provides a current to said electromagnetic coil means when a silicon controlled rectifier responds to an imbalance in the power lines; and means inhibiting the operation of the silicon controlled rectifier near the end of a cycle associated with the bridge rectifier, such that the electromagnetic coil means is not actuated if the electric power associated with the cycle is insufficient to cause the contacts to latch in an open position.

11. A ground fault circuit interrupter according to claim 10 wherein said flexure arm has a relatively narrow section and a relatively wide section and said torsion elements are formed by an aperture in said relatively wide section of said flexure arm.

12. A ground fault circuit interrupter according to claim 11 which further includes a latching mechanism holding said contacts open when said flexure arms are deflected.

13. A ground fault circuit interrupter according to claim 12 wherein said latching mechanism includes a two member spring responsive to one of said pivoting arms.

14. A ground fault circuit interrupter according to claim 13 which further includes a reset button operable to release said latching mechanism thereby allowing said contacts to close after the fault has been cleared.

15. A ground fault circuit interrupter according to claim 14 wherein one of said pivot arms includes an extension which cooperates with said two member spring.

16. A ground fault circuit interrupter according to claim 15 wherein one of said pivot arms further includes a surface which cooperates with a surface of said reset button.

17. A ground fault circuit interrupter according to claim 16 wherein said pivot arms include mating gears.

18. A ground fault circuit interrupter in a power distribution system comprising:

an electromagnetic coil means having a movable core;

at least two pivot arms that rotate in response to the linear movement of the movable core of said electromagnetic coil means;

at least two pairs of contacts, one contact of each pair being stationary and the other contact of each pair being disposed on a deflectable flexure arm, each of said deflectable flexure arms being responsive to the rotation of one of said pivot arms;

means detecting the occurrence of a fault in said power distribution system in order to actuate said electromagnetic coil means, such that said pivot arms rotate, thereby causing said deflectable flexure arms to separate said contacts and interrupt the flow of current, said detecting means having a bridge rectifier that provides a current to said electromagnetic coil means when a silicon controlled rectifier responds to an imbalance in the power lines;

means inhibiting the operation of the silicon controlled rectifier near the end of a cycle associated with the bridge rectifier, such that the electromagnetic coil means is not actuated if the electric power associated with the cycle is insufficient to cause the contacts to latch in an open position; and terminal means coupling electrical energy to said contacts, said terminal means including a terminal having a threaded aperture and a cooperating screw with a pressure pad disposed upon said screw.

19. A ground fault circuit interrupter according to claim 18 wherein said pressure pad includes a pair of dimples which interface with said screw head.

20. A ground fault circuit interrupter in a power distribution system comprising:

an electromagnetic coil means having a movable core;

at least two pivot arms that rotate in response to the linear movement of the movable core of said electromagnetic coil means;

at least two pairs of contacts, one contact of each pair being stationary and the other contact of each pair being disposed on a deflectable flexure arm, each of said deflectable flexure arms being response to the rotation of one of said pivot arms;

means detecting the occurence of a fault in said power distribution system in order to actuate said electromagnetic coil means, such that said pivot arms rotate, thereby causing said deflectable flexure arms to separate said contacts and interrupt the flow of current, said detecting means having a bridge rectifier that provides a current to said electromagnetic coil means when a silicon controlled rectifier responds to an imbalance in the power lines; and means inhibiting the operation of the silicon controlled rectifier near the end of a cycle associated with the bridge rectifier, such that the electromagnetic coil means is not actuated if the electric power associated with the cycle is insufficient to cause the contacts to latch in an open position, said inhibiting means including means comparing the cycle associated with the bridge rectifier to a fixed threshold.

21. A circuit according to claim 20 wherein said inhibiting means includes means comparing the cycle associated with the bridge rectifier to a threshold proportional to the line voltage.

22. A circuit according to claim 21 wherein the threshold of said comparing means is provided by an ac-coupled differentiating network.

23. A circuit according to claim 22 where said ac-coupled differentiating network includes means generating a waveform having twice the frequency of the cycle associated with the bridge rectifier.

24. A circuit according to claim 23 where the waveform, having twice the frequency of the cycle associated with the bridge rectifier, controls a transistor which shorts the gate of the silicon controlled rectifer.

25. A circuit according to claim 24 wherein said ac-coupled differentiating network includes a transistor, a zener diode connected in series with a capacitor and a resistor connected between the base of said transistor and the junction of said zener diode and said capacitor.

* * * * *